United States Patent [19]

Rausch

[11] Patent Number: 4,825,317

[45] Date of Patent: Apr. 25, 1989

[54] MECHANISM FOR DAMPING TAPE VIBRATIONS IN A MAGNETIC TAPE RECORDER

[75] Inventor: Robert Rausch, Munich, Fed. Rep. of Germany

[73] Assignee: Siemens Aktiengesellschaft, Berlin and Munich, Fed. Rep. of Germany

[21] Appl. No.: 70,795

[22] Filed: Jul. 7, 1987

[30] Foreign Application Priority Data

Jul. 25, 1986 [DE] Fed. Rep. of Germany ....... 3625249

[51] Int. Cl.$^4$ .............................................. G11B 15/64
[52] U.S. Cl. ................................ 360/102; 360/130.31; 360/130.32; 360/128
[58] Field of Search ..................... 360/102, 103, 130.3, 360/130.31, 130.32, 130.33, 130.34, 128, 122, 137

[56] References Cited

U.S. PATENT DOCUMENTS

| | | |
|---|---|---|
| 2,962,200 | 11/1960 | Pouliart et al. . |
| 3,134,527 | 5/1964 | Willis . |
| 3,151,796 | 10/1964 | Lipschutz . |
| 3,327,916 | 6/1967 | Weidenhammer et al. ........ 360/102 |
| 3,418,434 | 12/1968 | Groenewegen . |
| 3,422,411 | 1/1969 | Smith .............................. 360/102 |
| 3,678,216 | 7/1972 | Rousso, Jr. et al. . |
| 3,688,956 | 9/1972 | Kjos .............................. 360/130.31 |
| 3,855,621 | 12/1974 | Gluskin et al. ...................... 360/102 |
| 4,337,885 | 7/1982 | Stahler ................................ 226/97 |

FOREIGN PATENT DOCUMENTS

| | | |
|---|---|---|
| 0114689 | 8/1984 | European Pat. Off. . |
| 1499984 | 2/1970 | Fed. Rep. of Germany . |
| 52-45310 | 4/1977 | Japan ............................. 360/130.31 |
| 57-205847 | 12/1982 | Japan .................................. 360/137 |
| 58-6546 | 1/1983 | Japan ............................. 360/130.31 |
| 58-6521 | 1/1983 | Japan .................................. 360/122 |
| 58-97121 | 6/1983 | Japan .................................. 360/122 |

OTHER PUBLICATIONS

Fulton, "Pneumatic Brake/Pressure Pad for Tape Transport", RCA Technical Notes, No. 498, Sep. 1961.
"Elimination of Transverse Tape Vibration in a Magnetic Tape Unit", by Frauenfelder et al., IBM Technical Disclosure Bulletin, vol. 15, No. 8, Jan. 1973.

Primary Examiner—John H. Wolff
Assistant Examiner—Matthew J. Bussan
Attorney, Agent, or Firm—Hill, Van Santen, Steadman & Simpson

[57] ABSTRACT

A mechanism for use with a magnetic tape recorder having a tape drive composed of take-up and take-off reels, of buffer chambers allocated thereto, and a single tape capstan arranged between the buffer chambers and next to a write/read head. The tape capstan is reversible in the running direction. The mechanism of the present invention is for damping which opposes local deformations of the magnetic tape in the region of the head mirror of the magnetic head. This mechanism has a damping element in the form of a pneumatically acting jet comb comprising a plurality of nozzles residing under pressurization. These nozzles are arranged along a line proceeding transversely relative to the conveying direction of the magnetic tape and an air jet output by them impinges in the region of the leading ledge for the magnetic tape at the mirror of the magnetic head acting with a slight force component in tape conveying direction. Such a damping mechanism is particularly suited for a magnetic tape recorder means employed as digital storage devices in the upper performance category and having high tape speeds which enables reading both in forward run, as well as, in reverse run.

18 Claims, 2 Drawing Sheets

MECHANISM FOR DAMPING TAPE VIBRATIONS IN A MAGNETIC TAPE RECORDER

BACKGROUND OF THE INVENTION

This invention relates in general to a mechanism for damping tape vibrations in a magnetic tape recorder and, in particular, for magnetic tape recorders of the type which record binary data.

One of the directions in the development of magnetic tape recorders which are used to store digital data has lead to higher and higher tape speeds. Magnetic tape recorders having a nominal tape speed of 200 inches per second (ips), corresponding to about 5 m per second, are already currently available in the marketplace. Binary data are written in formated blocks and commercially available magnetic tape recorders use an interblock gap of about 7 mm for reasons of storage capacity. In start/stop operation, this corresponds to the path within which the magnetic tape recorder must be stopped and restarted. In magnetic tape recorder devices having high tape speeds, extremely high accelerations or retardations occur during the start/stop operation.

The forces acting on the data carrier, that is the magnetic tape, in start or stop phases cause tape motions or deformations in the region of the magnetic head of the tape recorder which are not entirely explained in detail. Included among the reasons for this is that the forces in magnetic tapes of variously manufacturers act differently even when used in the same magnetic tape recorder.

Apparently, the accelerating forces effect more or less pronounced local deformations of the magnetic tape even in the region of the head mirror of the magnetic head, these forces reduce the amplitude of the read output signal. In one type of magnetic tape, it is particularly the edge tracks which are affected by these forces of another type of magnetic tape are also affected by these forces of another type of magnetic tape.

Added to these problems is yet another influence which results from a feature of high performance magnetic tape recorders. In commercial magnetic tape recorders, the magnetic tape is transported from a take-off reel to a take-up reel for writing. Frequently, the tape transport ensues on the basis of a single capstan which can be reversed in moving direction and which is arranged adjacent to the magnetic head. Commercial magnetic tape recorders are frequently equipped such that they allow a reading even during a return transport of the magnetic tape from the take-up reel to the take-off reel, this function being usually referred to as "backwards read". During tape transport in the forward direction, the capstan is arranged following the magnetic head in the running direction of the magnetic tape and pulls the magnetic tape over the head mirror of the magnetic head. By contrast, when the tape is run in the opposite direction, the capstan pushes the magnetic tape over the head mirror.

This fact has differing consequences especially during the start or stop phases upon operation of the magnetic tape recorder for the functions of reading in the forward direction, as well as, in the reverse direction, since it is precisely during these phases that the buffered tape length in the buffer chamber of the magnetic tape recorder changes. Investigations have confirmed that the starting phase in conjunction with the device function "backwards read" is an especially critical operating condition. Particularly here, such glitches in the curve of the amplitude of the read output signals can occur and they may lead to read output errors even though commercial tape recorders can still clearly discriminate read output signals despite great fluctuations from the rated amplitude.

It can be concluded from the comparison of different amplitudes of read output signals during a tape transport in forward or reverse directions and during the starting phase of the magnetic tape recorder, that a different tape tension is one of the critical influencing variables. One could therefore attempt to eliminate the described problem by an increased tape tension. With a given tape run, that is, the geometrical fashioning of the tape drive, an increase in the tape tension via an increase of the pressurization in the buffer chambers leads to modifications of the properties of the tape drive in and of itself.

Narrow limits are therefore placed on an increase of the tape tension for avoiding other, undesired reactions on the tape transport, because the tape tension of 3.6 N prescribed by the standard may not be exceeded. An increase in the tape tension also has the disadvantages of a considerably increasing power consumption and, over and above this, an increase in the surface pressure between the magnetic tape and the magnetic head mirror also occurs. An increase in the tape tension alone is therefore not suitable for resolving the above described problem.

It is also known in the technology of magnetic tape recorders that a pressure pad may be utilized to improve the contact between the magnetic tape and the magnetic head mirror. In particular, this measure is known in conjunction with magnetic tape recorders of entertainment electronics or magnetic tape recorders of the lower performance category having lower tape speeds. Such a measure may still be justifiable in such devices, but its employment in fast running, commercial tape recorders is inapplicable because of an excessive tape wear. The pressure pad is also a disadvantage in that it causes excessive heating of the magnetic tape.

In order to overcome these disadvantages in the prior art and to avoid a local lift-off of the magnetic tape from the magnetic head mirror, a planar compressed air cushion could be generated opposite the head mirror in a pneumatic way as an equivalent measure of a mechanical element, such as a pressure pad, for pressing the magnetic tape against the head mirror. However, investigations have shown that no effective alleviation for the disturbances in the amplitude of the read output signals can be achieved with a planar air pillow.

SUMMARY OF THE INVENTION

It is therefore an objective of the present invention to create a mechanism for damping tape vibrations in a magnetic tape recorder means of the species described above which opposes tape deformations in the region of the magnetic head, particularly during the starting or stopping phases of the magnetic tape recorder. This objective is achieved with simple means and without reactions on the tape drive. In a mechanism for damping tape formations of the type initially cited, this objective is achieved as follows.

The present invention involves a special structural fashioning of a damping element. The novel damping element does not generate a planar air cushion, since such an air cushion does not provide any effective improvement of the amplitude of the read output signals. Instead, the solution of the present invention provides a pressure profile acting on the magnetic tape in a zone extending transversely relative to the running direction which is tightly laterally limited, that is, as seen in tape running direction. In general terms, what is desired with the solution of the present invention is to influence the magnetic tape only along the line proceeding transversely relative to the tape running direction. The influencing region lies where the magnetic tape experiences its greatest deflection when running over the mirror of the magnetic head.

The damping element of the present invention produces an air jet and it is crucial that the air jet acting on the magnetic tape not be directed exactly perpendicular to the effective surface of the head mirror, but be inclined slightly in the tape conveying direction so that a small force component in conveying direction derives therefrom. As the improvements of the invention will show, this angle of inclination, $\delta$, relative to a perpendicular to the surface of the magnetic tape is less than 10 angular degrees and preferably about 8 angular degrees. The effective force component in the tape conveying direction is therefore very small in comparison to the force component acting perpendicularly on the magnetic tape. However, it is apparently nonetheless efficient in order to locally promote the deflection of the magnetic tape, that is, to press the magnetic tape against the neighboring read gap by a sufficient degree of the head mirror of the magnetic head.

Although this is not completely clarified in detail in terms of physics, the greater, vertically acting force component apparently effects a stretching of the magnetic tape in the direction of its lateral edges so that it presses against the read gap. The significantly increased uniformity in the curve of the amplitude of the read output signals over all data tracks cannot be explained otherwise.

According to the present invention, a focused air stream having a defined flow profile acting transversely relative to the running direction of the magnetic tape is desired, this comprises a flat maximum in the tape middle and decreasing symmetrically linearly at the lateral edges of the magnetic tape. In addition to the desired function of achieving a uniform, straight line tape cross-section, the damping element is fashioned such that it has the advantage of a nearly negligible air loss. The actual, added power consumption lies on the order of magnitude of only a few percent of the overall consumption. On the other hand, the line-like action also results in such a slight increase in the surface pressure of the magnetic tape against the mirror of the magnetic head, that the additional tape wear and the additional occurring frictional heat are negligible.

BRIEF DESCRIPTION OF THE DRAWINGS

The features of the present invention which are believed to be novel, are set forth with particularly in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

The present invention has general applicability but is most advantageously utilized in a high speed magnetic tape recorder for storing binary data.

Figure 1:
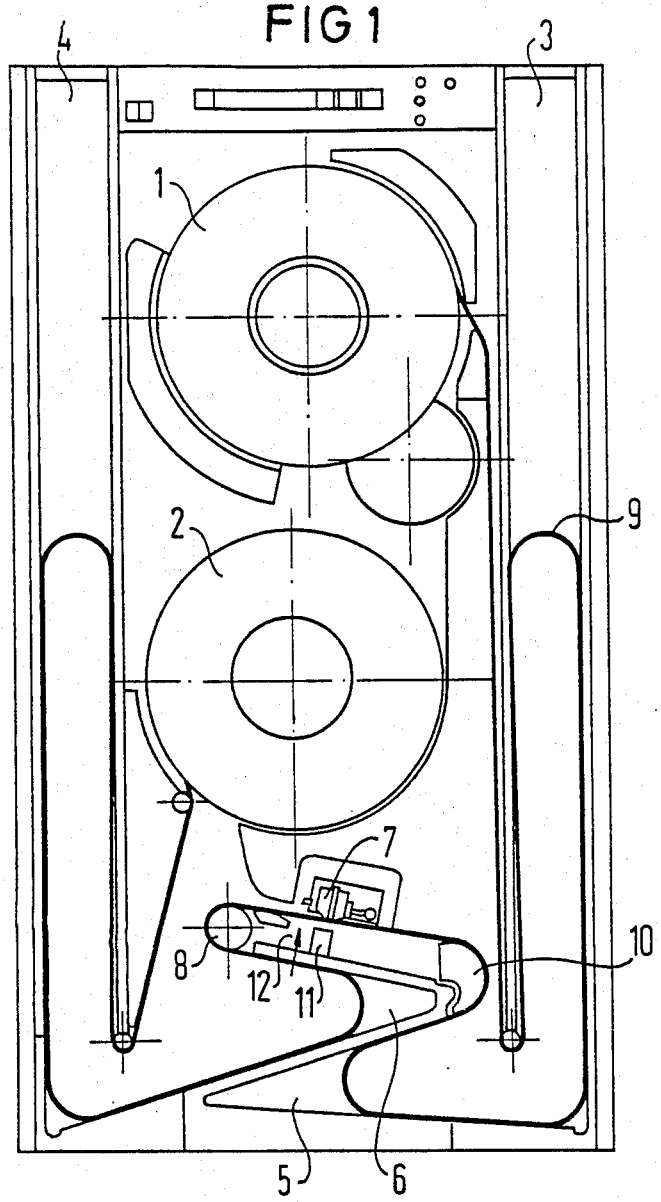
FIG. 1 is a schematic illustration of a tape drive for a magnetic tape recorder in which a mechanism of the invention for damping tape vibrations is arranged residing opposite the magnetic head.

The tape drive of a magnetic tape recorder is shown in schematic illustration in FIG. 1 and has a take-off reel 1 and a take-up reel 2. Each reel has a buffer chamber 3 and 4, respectively, having downwardly opened ends allocated laterally to the take-off reel 1 and the take-up reel 2. Two pre-chambers 5 and 6 are nested in one another and are essentially horizontally aligned. These pre-chambers 5 and 6 are opened in the direction of the buffer chambers 3 and 4, respectively. A magnetic head 7 which, as is typical in commercial tape recorders used in digital storage, is fashioned as a combined multi-track read/write head, is arranged above the pre-chambers 5 and 6.

A tape capstan 8 which is reversible in a rotational sense is provided immediately next to the magnetic head 7. The forward direction corresponds to a rotational sense of the tape capstan 8 in a counter-clockwise direction. A magnetic tape 9 thereby runs from the take-off reel 1 into the allocated buffer chamber 3, proceeds from there into the pre-chamber 5 and past the magnetic head 7 via a pneumatic guide post 10 and onto the tape capstan 8. The tape capstan 8 conveys the magnetic tape 9 via the second pre-chamber 6 and the second buffer chamber 4 to the take-up reel 2. In reverse direction, the magnetic tape 9 is outputted from the take-up reel 2 via the buffer chamber 4, the pre-chamber 5 to the pre-chamber 6 and the buffer chamber 3 to the take-up reel 1. In every case, the magnetic tape 9 is transported only by the tape capstan 8, whereas the take-off reel 1 and take-up reel 2 comprises independent winding drives which are controlled by the lengths of the buffer tape loops in the buffer chambers 3 and 4. The tape drive of a high performance magnetic tape recorder shown here as an example is known in the prior art and needs no detailed explanation. What is of significance here, is that the magnetic tape 9 is conveyed past the combined multi-track write/read head 7 only by the tape capstan 8 in both running directions in cooperation with the pre-chambers 5 and 6.

These high performance magnetic tape recorders usually work in start/stop operation, but the special characteristic that the magnetic tape 9, with the least possible slip relative to the tape capstan 8, must be decelerated in a short time or alternatively must be brought back to normal tape speed very quickly given a restart operation. In fast running magnetic tape recorders of this performance category, the nominal speed of the magnetic tape is approximately 200 ips, this corresponds to about 5 m/s in the metric system. The stop and start movements of the magnetic tape 9 must be sequenced within an interblock gap which usually amounts to only about 7 mm given this type of apparatus. High stopping retardations or starting accelerations of the magnetic tape 9 obviously result from these boundary conditions. These can lead to undesired tape movements which are particularly disturbing in the region of the multi-track write/read head 7.

Figure 2:
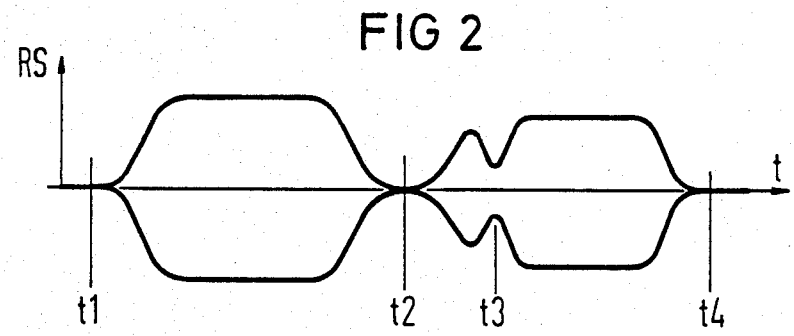
FIG. 2 is a graph of the curve of amplitudes of read output signals for a forward run followed by a reverse run of the magnetic tape in the respective re-start phase of the magnetic tape recorder.

FIG. 2 shows an example of the effects of such a disturbance in the curve of the signal amplitude of the read output signal RS over the time axis t. A signal curve for the operating condition "read in forward direction" is therefore shown between points in time t1 and t2. Between times t1 and t2, the magnetic tape 9 is started, runs up to nominal speed and, finally, is again decelerated. The steady increase in the signal amplitude of the read output signal in the starting phase corresponds to the acceleration of the magnetic tape 9 as expected; the read output signal RS reaches is maximum as soon as the magnetic tape 9 has reached is nominal speed. The analogous case applies for the decending curve between t1 and t2.

A comparable curve of the read output signal RS for the operating condition "read in reverse" is shown between points in time t2 and t4, whereby the magnetic tape 9 is conveyed in a reverse direction. In this example, the read output signal RS initially increases steadily as expected, however, at point in time t3, the read output signal then has a pronounced, deep glitch in the signal amplitude and not rising again until thereafter in reaching the maximum at the nominal speed of the magnetic tape 9. This signal glitch demonstrates the influence of the disturbance in the tape motion given restart of the magnetic tape recorder which can lead to errors in the interpretation of the read output signal in critical cases. Even though the read electronics of such magnetic tape recorders is normally relatively insensitive in view of fluctuations of the amplitude of the read output signals, these critical cases may be adversely influenced by the glitch which occurs in the read output signal.

Investigations have shown that such disturbances as exemplified in FIG. 2 are not based, for instance, on a slip of the magnetic tape 9 relative to the tape capstan 8 due to the high tape acceleration. On the contrary, undesired tape motion in the region of the multi-track write/read head 7 is the cause that produces an intermittent, local lift-off of the magnetic tape 9 from the head mirror of the multi-track write/read head 7, at least in the region of its read gap. The results of this investigation are particularly confirmed in that different signal curves of the read output signal RS were measured in neighboring data tracks in one and the same procedure.

Returning now to FIG. 1, a pneumatic damping element 11 is schematically shown under the magnetic head 7. This damping element 11 directs a focused air jet, shown schematically by an arrow 12, against the underside of the magnetic tape 9 so as to apply the magnetic tape 9 to the contour of the multi-track write/read head 7 in the region thereof.

Figure 3:
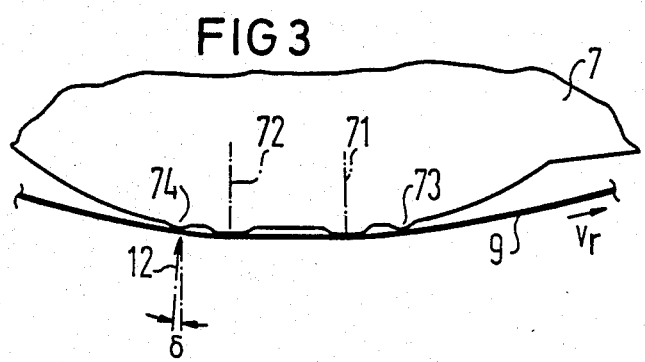
FIG. 3 is a schematic illustration of the function of a damping mechanism according to the present invention, whereby an elevation of the contour of the mirror of the magnetic tape is particularly shown enlarged.

This is again schematically illustrated in FIG. 3 which, in particular, shows the contour of the head mirror of the multi-track write/read head 7 and of the magnetic tape 9 moving in a reverse direction $V_r$ in an enlarged scale. The contour of this known multi-track write/read head 7 is essentially composed of a circular segment. Two broken lines 71 and 72 indicate the position of the write gap and of the read gap, respectively, of the multi-track write/read head 7. Two hump shaped elevations in the contour at both sides of the gaps at locations 71 and 72 indicate leading ledges 73 and 74, respectively, for the magnetic tape 9 when it is conveyed in forward direction or in reverse direction, respectively.

As indicated in FIG. 3, the leading ledge 74 allocated to the reverse direction is the location at which the magnetic tape 9 is deflected or guided at the head mirror of the multi-track write/read head 7. As again indicated by the arrow 12 in FIG. 3, the air stream output by the damping element 11 (not shown in FIG. 3) should strike the magnetic tape immediately following this leading ledge 74. This air stream is placed at a small angle relative to the essentially horizontal course of the magnetic tape 9 in the region of the air gaps 71 and 72, respectively. This angle of inclination, $\delta$, is approximately 8°.

Figure 4:
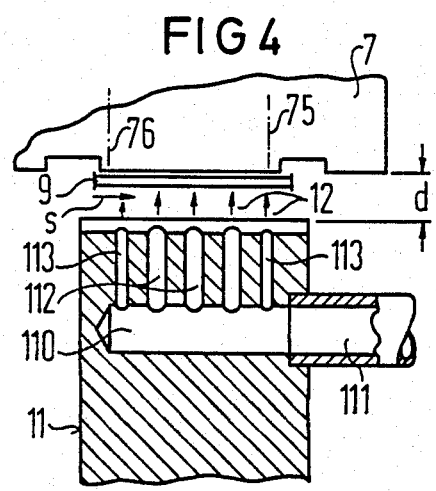
FIG. 4 is a schematic illustration of a partial sectional view through the damping mechanism as seen in the tape direction.

FIG. 4 shows an elevation of the damping means which lies in a plane perpendicular to FIG. 3. In a detail, a part of the multi-track write/read head 7 is indicated and two dot-dash lines 75 and 76 indicate the location of the magnetic head units allocated to the data tracks one or, respectively, nine. The magnetic tape 9 is indicated in cross-section therebelow. The damping element 11 is arranged at a distance d from the head mirror of the multi-track write/read head 7. The distance d may be, for example, 4 mm.

The damping element 11 is shown in a partial section which illustrates its essential structure. It comprises a horizontally proceeding bore which forms a feeder channel 110 for compressed air which may be connected via a pressure conduit 111 to the central air supply of the magnetic tape recorder and which supplies the damping element 11 with compressed air via pneumatic valves in a known way. A row of air nozzles 112 and 113 are arranged at regular intervals perpendicular to the feed channel 110. The nozzles 113 lying at the outside relative to the magnetic tape 9 have a smaller diameter than the central nozzles 112.

Figure 5:
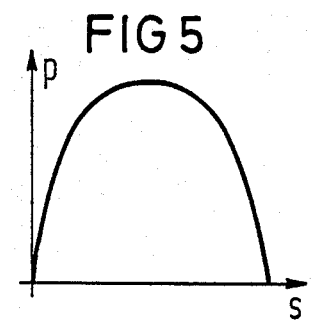
FIG. 5 is a graph of the flow profile in the plane transverse relative to the running direction of the magnetic tape which is utilized with this damping mechanism.

The reason for this structure is to create a pressure profile as shown in FIG. 5. The aim is a symmetrical distribution of the pressure p over a cross-sectional line s of the magnetic tape 9 which comprises a flat, but nonetheless pronounced maximum, in the center of the tape and which decreases symmetrically and essentially linearly in the region of the lateral edges of the magnetic tape. Given nozzles 112 and 113 arranged at regular intervals, this can be achieved in that the diameters of the nozzles 112 have a size, for example, of approximately 0.5 mm and those of the nozzles 113 of approximately 0.4 mm.

A further significant point of view in the design of the damping element 11 is that the fanned air stream does not strike the magnetic tape 9 planarly, but only along a line. As viewed in the conveying direction of the tape, the air stream is greatly focused. That is, the magnetic tape 9 is conducted over an air comb that acts like a rejecting or fleeting edge. The flow profile of the air stream viewed in the tape conveying directions $V_r$ is lobe fashioned and is focused as much as possible, which provides the desired effect of repelling the magnetic tape in the direction of the contour of the head mirror and smoothing it at the same time.

Apart from the afore-mentioned boundary conditions in view of the direction of the air stream output of the damping element 11, its angle of inclination and the pressure profile as set forth, the described embodiment of the damping element itself represents only one of many possible embodiments. Thus, for example, the desired pressure profile could also be achieved with air nozzles having identical diameters but with different spacing relative to one another. The damping element could be designed as a hollow member and so forth.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Mechanism for damping tape vibrations in a magnetic tape recorder having a tape drive, take-up and take-off reels with buffer chambers allocated thereto, a tape capstan located between the buffer chambers and adjacent a magnetic write-read head, the tape capstan being reversible in terms of a transport direction of the magnetic tape, said mechanism substantially eliminating deformations of the magnetic tape in the region of a transducing surface of the magnetic head, comprising:
    a damping element mounted in juxtaposition to the transducing surface of the magnetic head and having a plurality of nozzles being under pressurization and forming a pneumatic air jet comb having an air jet output, axes of the nozzles being arranged in parallel in a plane lying transversely relative to the longitudinal direction of the magnetic tape and intersecting the magnetic tape in a region of a leading ledge of the transducing surface with a slight angle of deviation from the direction vertical to a surface of the magnetic tape so as to provide a slight force component of the air jet output in the direction of transportation of the magnetic tape relative to the magnetic head.

2. Mechanism described in claim 1, wherein, said angle of inclination is less than 10°.

3. Mechanism described in claim 2, wherein said angle of inclination is approximately 8°.

4. Mechanism described in claim 1, wherein for achieving a pressure profile of said air jet output of said damping element which initially linearly increases from both edges of said tape and has a substantially flat maximum in a center of said tape, said nozzles of said damping element arranged in regular spacing and connected to a common feeder channel which is under pressurization during write/read operation, said nozzles having symmetrically increasing diameters from ends of said line to a center of said line.

5. Mechanism described in claim 4, wherein said diameters of said nozzles, irrespective of differences in their diameters, being small in comparison to said spacing of said nozzles relative to one another.

6. Mechanism described in claim 5, wherein said diameters of said nozzles are less than 1.0 mm.

7. Mechanism described in claim 5, wherein said diameters of said nozzles are less than 0.5 mm.

8. Mechanism described in claim 1, wherein said tape capstan is located after said magnetic head in reference to a forward direction of the tape transport direction, and said write/read head with said transducing surface has outwardly situated leading ledges adjacent, respectively, to a write gap and to read gap, whereby said transducing surface has a portion set slightly back between said leading ledges and between said gaps, said mechanism further comprising said damping element located opposite said leading ledge associated with said read gap and being slightly inclined in the tape transport direction for a reverse running, so that said air jet output engages said magnetic tape immediately after said magnetic tape transverses said leading ledge which is located adjacent to said read gap.

9. Mechanisms for damping tape vibrations in a magnetic tape recorder having a tape drive, take-up and take-off reels with buffer chambers allocated thereto, a tape capstan located between the buffer chambers and adjacent a magnetic write/read head, the tape capstan being reversible in terms of a transport direction of the magnetic tape, said mechanism substantially eliminating deformations of the magnetic tape in the region of a transducing surface of the magnetic head, comprising:
    a damping element having a plurality of nozzles connected to a common feed
    channel and being under a predetermined pressurization;
    said plurality of nozzles regularly spaced along a line proceeding transversely relative to the transport direction of the magnetic tape and having symmetrically increasing diameters from ends of said line to a center of said line, said diameters of said nozzles being small in comparison to said spacing of said nozzles from one another;
    an air jet output of said plurality of nozzles impinging said magnetic tape in the region of a leading edge of the transducing surface of the magnetic head and the air jet output directed by the damping element so as to produce a slight force component in said transport direction of said magnetic tape at an angle of inclination relative to the perpendicular to a surface of the magnetic tape, said angle of inclination being less than 10° and greater than 0°.

10. Mechanism described in claim 9, wherein said angle of inclination is approximately 8°.

11. Mechanism described in claim 9, wherein said air jet output of said damping element has a pressure profile which initially linearly increases from both edges of said tape and has a substantially flat maximum in a center of said tape.

12. Mechanism described in claim 9, wherein said air jet output of said damping element has a predetermined pressure profile.

13. Mechanism described in claim 9, wherein said diameters of said nozzles is less than 0.5 mm.

14. Mechanism described in claim 9, wherein said tape capstan is located after said magnetic head in reference to a forward direction of tape transport, and said write/read head with said transducing surface has outwardly situated leading ledges adjacent, respectively, to a write gap and to a read gap, whereby said transducing surface has a portion set slightly back between said leading ledges and between said gaps, said mechanism further comprising said damping element located opposite said leading ledge located adjacent to said read gap and being slightly inclined in the tape transport direction for a reverse running, so that said air jet output engages said magnetic tape immediately after said magnetic tape traverses said leading ledge which is located adjacent to said read gap.

15. Mechanism for damping tape vibrations in a magnetic tape recorder having a tape drive, take-up and take-off reels with buffer chambers allocated thereto, a tape capstans located between the buffer chambers and adjacent a magnetic write/read head, the tape capstan being reversible in terms of a transport direction of the magnetic tape, said mechanism substantially eliminating deformations of the magnetic tape in the region of a transducing surface of the magnetic head, said tape capstan located after said magnetic head as referenced to a forward direction of tape transport direction, and said write/read head with said transducing surface having outwardly situated leading ledges adjacent, respectively, to a write gap and to a read gap, whereby said transducing surface has a portion set slightly back between said leading ledges and between said gaps, said mechanism comprising:

damping element fashioned in the form of a pneumatically acting jet comb, said damping element located opposite said leading ledge located adjacent to said read gap and being slightly inclined in the tape transport direction for a reverse running, said damping element having a plurality of nozzles connected to a common feed channel and being under a predetermined pressurization;

said plurality of nozzles regularly spaced along a line proceeding transversely relative to the transport direction of a magnetic tape and having symmetrically increasing diameters from ends of said line to a center of said line, said diameters of said nozzles being small in comparison to said spacing of said nozzles from one another;

an air jet output of said plurality of nozzles impinging said magnetic tape immediately after said magnetic tape transverses said leading ledge located adjacent to said read gap of said transducing surface of said magnetic head and said air jet output directed by said damping element so as to produce a slight force component in said transport direction of said magnetic tape for reverse running at an angle of inclination relative to the perpendicular to a surface of the magnetic tape said angle of inclination being less than 10° and greater than 0°.

16. Mechanism described in claim 15, wherein said angle of inclination is approximately 8°.

17. Mechanism described in claim 15, wherein said air jet output of said damping element has a pressure profile which initially linearly increases from both edges of said tape and has a substantially flat maximum in a center of said tape.

18. Mechanism described in claim 15, wherein said diameters of said nozzles is less than 0.5 mm.

* * * * *